Oct. 29, 1963        J. MARCHAND        3,108,665
TRELLIS-WORK STRUCTURE COMPOSED OF SHAPED METALLIC SECTIONS
Filed Oct. 7, 1960
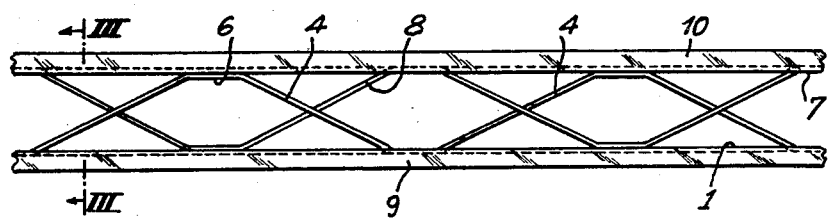
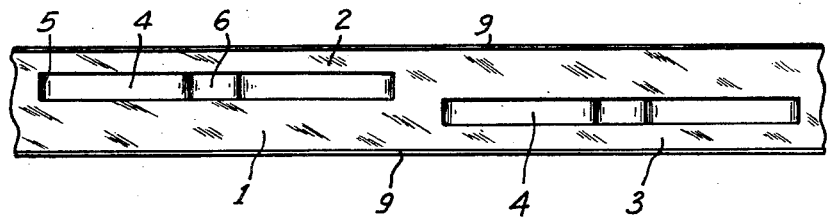
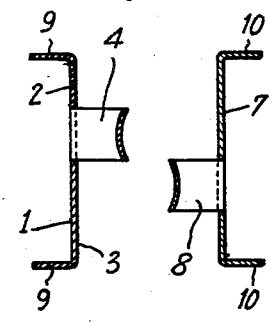
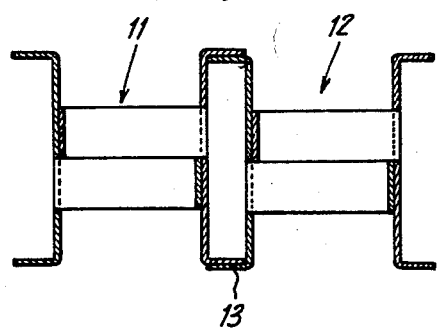
INVENTOR
JACQUES MARCHAND
By Linton and Linton
ATTORNEYS

United States Patent Office 3,108,665
Patented Oct. 29, 1963

3,108,665
TRELLIS-WORK STRUCTURE COMPOSED OF SHAPED METALLIC SECTIONS
Jacques Marchand, 94 Boulevard Malesherbes, Paris, France
Filed Oct. 7, 1960, Ser. No. 61,212
Claims priority, application France Oct. 13, 1959
3 Claims. (Cl. 189—82)

The present invention has for its object the manufacture of metallic trellis-work posts composed of shaped sections arranged in parallel relation, spaced apart and joined to each other by welding cross-stays constituted by stamped-out strips arranged in between the said sections so as to produce a strong combined assembly which is characterized by the best economy of material.

The invention also has for its object to form a trellis-work structure of this type permitting of the maximum mechanization in the production thereof, thereby reducing the cost price of the structure.

The trellis-work structure in accordance with the present invention can be applied to all types of supporting planes, whether rigid or articulated, to all construction elements such as floors, girders, posts and the like, in which it is an advantage to ensure the rigid spacing apart of longitudinal girders.

The trellis-work structure in accordance with the present invention is composed of metallic shaped sections having a flat bottom, the bottom portions of the said sections being arranged in parallel relation and at a distance from each other. This intermediate distance is rigidly maintained by virtue of the fact that the sections are joined together by means of cross-stays drawn-out by stamping in the central portions of each bottom portion of a section and then welded face against face to the bottom of the adjacent section.

Each cross-stay is drawn from the bottom of the section by elongation of the metal between the two extremities of junction with the particular section of which the said cross-stay forms a part. The cross-stay will usually have a symmetrical shape which, starting from the extremities thereof, consists of two substantially straight sloping arms joined together by a flat portion which is parallel to the bottom of the initial section and which is intended to be welded by electric welding means, face against face, to a solid portion of an adjacent section.

The stamping operation is so designed as to give to the sloping arms of the cross-stay a cambered profile which increases the rigidity and the aptitude of the said cross-stay to withstand efforts of compression.

However, this arrangement is not given by way of limitation, and without thereby departing from the scope of the present invention, the cross-stay could, if so desired, be reduced to a small tongue cut-out as previously described and not actually stamped but only cambered and joined to the section of which it forms a part only at one of its extremities, whereas the other extremity is provided in this case with a flat portion intended, in the manner which has been stated above, to be welded to an adjacent section.

In the longitudinal direction of the section, an arrangement which is an inherent feature of the present invention additionally consists in that the successive cross-stays are placed alternately above and below the central longitudinal line of the section, known also as the "neutral fibre," in such manner that two identical specimens of a section which has thus been stamped-out can be welded one on the other after turning over one of the two sections along the longitudinal axis of the said section and that in addition, the cross-stays are placed alternately above or below the cross-stays of the adjacent section, thereby producing a very intimate association of two adjacent sections, each section being capable at the same time either of bearing against the next section or of supporting this latter according to the relative position of the cross-stays at the level considered along the length of the sections.

There will be described below a particular form of construction starting with a U-shaped section, which is a very common shape of section among the types produced by bending or shaping, but the present invention is not based on a particular shape of section but only on the principle of application of shaped sections, namely flat strips having folded-back flanges according to the shape which is best calculated to increase the rigidity of these strips and to suit the particular application which is considered. It is merely the most simple form of construction which will be described below. By the juxtaposition of two sections, the invention is furthermore conducive to the convenient construction, by electric spot-welding or seam-welding, of rectangular tubes which offer excellent resistance to stresses as a function of the weight of metal employed.

In order that the present invention may be properly understood, a few examples of construction will be described below, reference being made to the accompanying drawings, in which:

FIG. 1 is a partial plan view of an element with two strips of metal;

FIG. 2 is a corresponding side view;

FIG. 3 is a transverse cross-section on a larger scale taken along the lines III—III of FIGS. 1 and 2; and FIG. 4 is a cross-section similar to FIG. 3, but illustrating the assembly of a number of elements constituted according to FIGS. 1 to 3.

In the example of construction shown in FIGS. 1 to 3, a flat strip of metal 1 comprises marginal portions 2—3 left in the plane of the strip, while the connecting cross-stays 4 have been stamped-out on a same side of the strip and arranged alternately on each side of the central line of the said strip. Each cross-stay 4 comprises, starting from the extremities 5 of junction of the said cross-stay with the strip, straight sloping arms joined to each other by a bottom portion 6 welded face against face to a solid portion oppositely facing an adjacent strip 7 which is identical to the strip 1, but orientated in the contrary direction. The strip 7 is provided with stamped cross-stays 8 which are identical to the cross-stays 4 and welded in similar manner to a solid portion of the strip 1.

A cambered profile which is either dish-shaped or U-shaped can be imparted by stamping to the sloping arms of the cross-stays 4 and 8.

The strips 1 and 7 can be completely flat or their edges 9 and 10 can preferably be folded back by bending or shaping, for example outwards, that is to say, on the side opposite to that of the cross-members 4 and 8. This bending has the effect of increasing the rigidity of the elements. Furthermore, if the strips are bent into U-sections, this arrangement can be employed to useful effect by assembling the elements together in accordance with FIGS. 1 to 3 by means of spot-welding or seam-welding, thereby constituting, between two elements 11 and 12 comprising two strips and along the line of assembly, a rectangular profiled caisson 13 of great strength, as shown in FIG. 4.

In order to bring out clearly the advantage of the present invention, it will be mentioned merely by way of example that in order to make certain types of panelling, steel sections are at present employed having a thickness of 3 mm. and a width of 40 mm. which are put to use in a variety of ways by hand-welding. The weight of metal which is necessary per square meter is usually 30 kilograms and the rate of production is from 1 to 5 hours per square meter. However, the present invention makes it possible to produce panels which can withstand even heavier loads although only employing sheet steel of 0.6 mm. and their manufacture can be mechanized to permit a production of 130 kilograms per hour, while the panels only weigh from 8 to 15 kilograms per square meter, so that the surface produced in the same period of time is multiplied in this example by a factor of the order of 10 to 80.

It will be understood that the examples of construction as described above and as illustrated in the accompanying drawings are not intended to be limitative in character and that various modifications or additions could be contemplated without thereby departing from the spirit or the scope of the present invention, which must therefore be interpreted in the broadest possible manner.

I claim:

1. A metallic trellis-work structure comprising a plurality of elongated metallic sections each having a U-shaped cross-section provided by a web and a pair of flanges extending normal to and from opposite edges but the same side of said web, longitudinal strips to one side of the central line of each of said webs adjacent to the neutral fiber of said web being separated except at their ends from said web and extending laterally from a side of said web opposite to said flanges, central portions of said strips being attached to the web side of an adjacent one of said sections from which the strips thereof extend and the flanges of adjacent sections being superimposed and joined together forming closed rectangular caisson girders.

2. A metallic trellis-work structure as claimed in claim 1 wherein the strips of each of said webs are positioned along the length of their webs alternating on opposite sides of said neutral fiber of their web leaving a solid portion of each web opposite each strip and each of the strips of an adjacent web being connected to one of said solid portions.

3. A metallic trellis-work structure as claimed in claim 1 wherein each of said strips has a cambered profile with two straight end portions and said central portion joining said end portions and extending parallel to their web.

References Cited in the file of this patent

UNITED STATES PATENTS

| 2,146,540 | Hahn et al. | Feb. 7, 1939 |
| 2,778,459 | Hecker et al. | Jan. 22, 1957 |
| 2,913,078 | Kaiser | Nov. 17, 1959 |

FOREIGN PATENTS

| 544,943 | Great Britain | May 5, 1942 |